United States Patent
Murakami

(10) Patent No.: US 8,860,758 B2
(45) Date of Patent: Oct. 14, 2014

(54) DISPLAY CONTROL APPARATUS AND METHOD FOR DISPLAYING OVERLAPPING WINDOWS

(75) Inventor: Waki Murakami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 13/323,197

(22) Filed: Dec. 12, 2011

(65) Prior Publication Data

US 2012/0154435 A1    Jun. 21, 2012

(30) Foreign Application Priority Data

Dec. 15, 2010  (JP) .................................. 2010-279888
May 9, 2011  (JP) .................................. 2011-104507

(51) Int. Cl.
  *G06F 3/14* (2006.01)
  *G09G 5/14* (2006.01)
(52) U.S. Cl.
  CPC ... *G06F 3/14* (2013.01); *G09G 5/14* (2013.01)
  USPC ............ 345/629; 345/634; 345/636; 345/637
(58) Field of Classification Search
  None
  See application file for complete search history.

(56) References Cited

U.S. PATENT DOCUMENTS

| | | | | |
|---|---|---|---|---|
| 5,590,265 A * | 12/1996 | Nakazawa | ..................... | 715/790 |
| 5,651,107 A * | 7/1997 | Frank et al. | ................... | 715/768 |
| 5,675,755 A * | 10/1997 | Trueblood | ..................... | 715/791 |
| 6,031,530 A * | 2/2000 | Trueblood | ..................... | 715/791 |
| 7,168,048 B1 * | 1/2007 | Goossen et al. | ............. | 715/797 |
| 7,257,777 B1 * | 8/2007 | Kanevsky et al. | ............ | 715/794 |
| 7,342,594 B1 * | 3/2008 | Ort et al. | ........................ | 345/629 |
| 7,724,279 B2 * | 5/2010 | Karaoguz et al. | ............ | 348/135 |
| 7,956,869 B1 * | 6/2011 | Gilra | ............................. | 345/592 |
| 2002/0073123 A1 * | 6/2002 | Tsai | ............................... | 707/526 |
| 2003/0142133 A1 * | 7/2003 | Brown et al. | ................. | 345/768 |

FOREIGN PATENT DOCUMENTS

| | | |
|---|---|---|
| CN | 1809863 A | 7/2006 |
| CN | 1893531 A | 1/2007 |
| CN | 101268437 A | 9/2008 |
| JP | 08-123652 A | 5/1996 |
| JP | 10-177466 A | 6/1998 |

* cited by examiner

*Primary Examiner* — David Zarka
*Assistant Examiner* — Jason Pringle-Parker
(74) *Attorney, Agent, or Firm* — Canon USA, Inc. IP Division

(57) ABSTRACT

An aspect of the present invention includes a detection unit configured to detect content of second drawing data drawn in a second window, which is displayed on a lower layer of a first window, and a display control unit configured to control display by determining, based on the content of the second drawing data, whether to perform first control, in which the second drawing data is displayed in an overlap region, which is a region in which the first window and the second window overlap, in such a way as to be visible in the first window, or second control, in which the second drawing data is not displayed in the overlap region or the second drawing data is displayed in such a way as to be less visible in the first window than when the first control is performed.

6 Claims, 14 Drawing Sheets

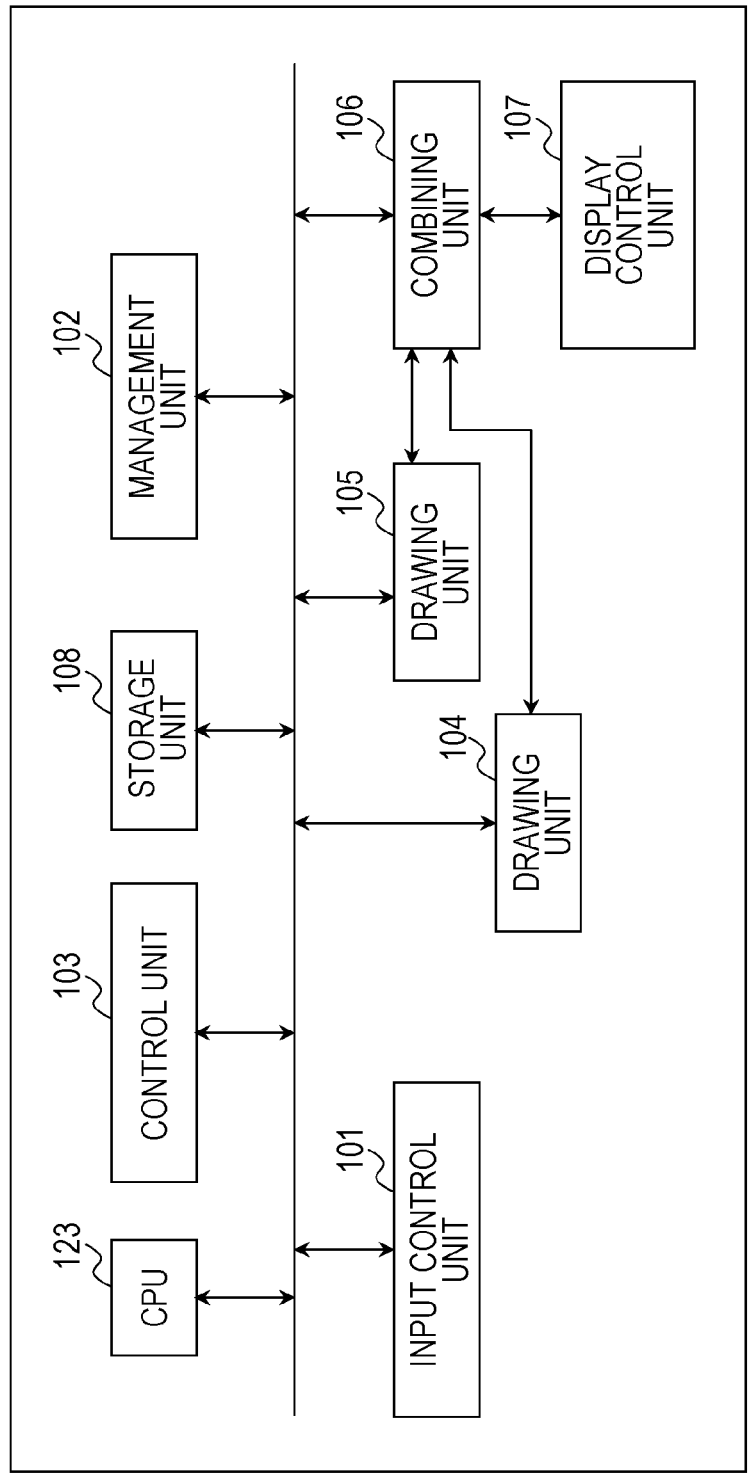

FIG. 2A

Currently, a system is generally used in which a plurality of different applications independently draw windows on a display screen of a personal computer, a digital home appliance, a mobile device, or the like. Nowadays, as a result of improvement in the graphics drawing performance and provision of versatile user interfaces, a system is also used in which a window has transparency so that a window on a lower layer is visible. In addition, data to be drawn in various windows includes videos having high frame rates and high resolution and animations having sophisticated graphics.

Currently, a system is generally used in which a plurality of different applications independently draw windows on a display screen of a personal computer, a digital home appliance, a mobile device, or the like. Nowadays, as a result of improvement in the graphics drawing performance and provision of versatile user interfaces, a system is also used in which a window has transparency so that a window on a lower layer is visible. In addition, data to be drawn in various windows includes videos having high frame rates and high resolution and animations having sophisticated graphics.

FIG. 2B

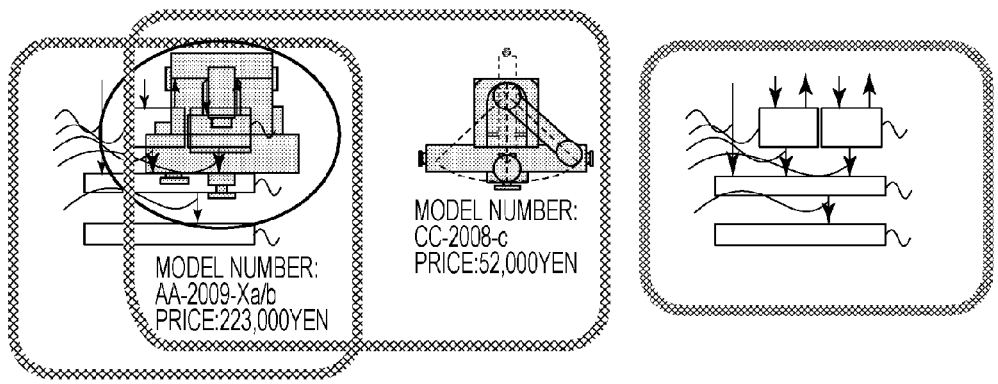

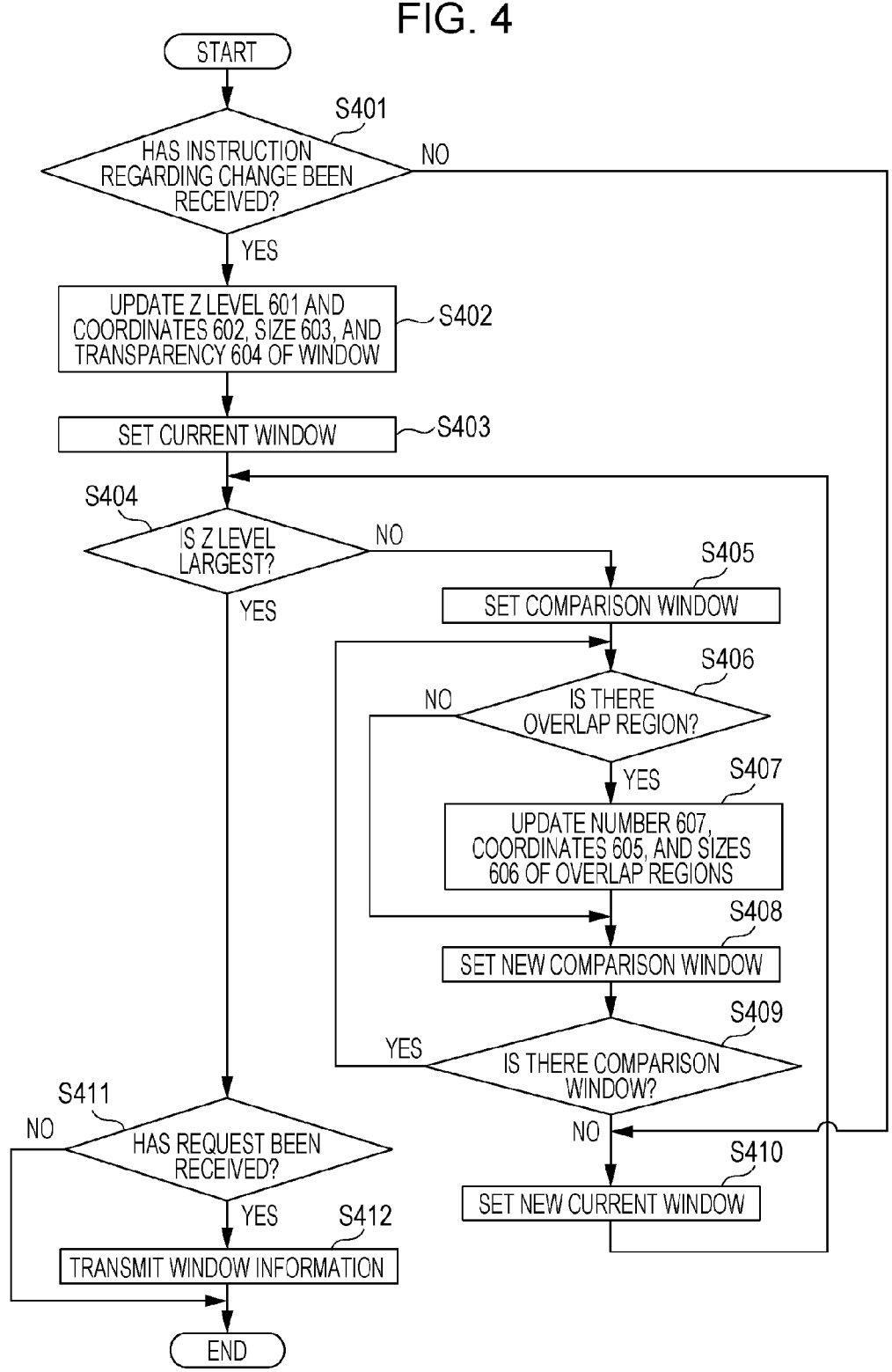

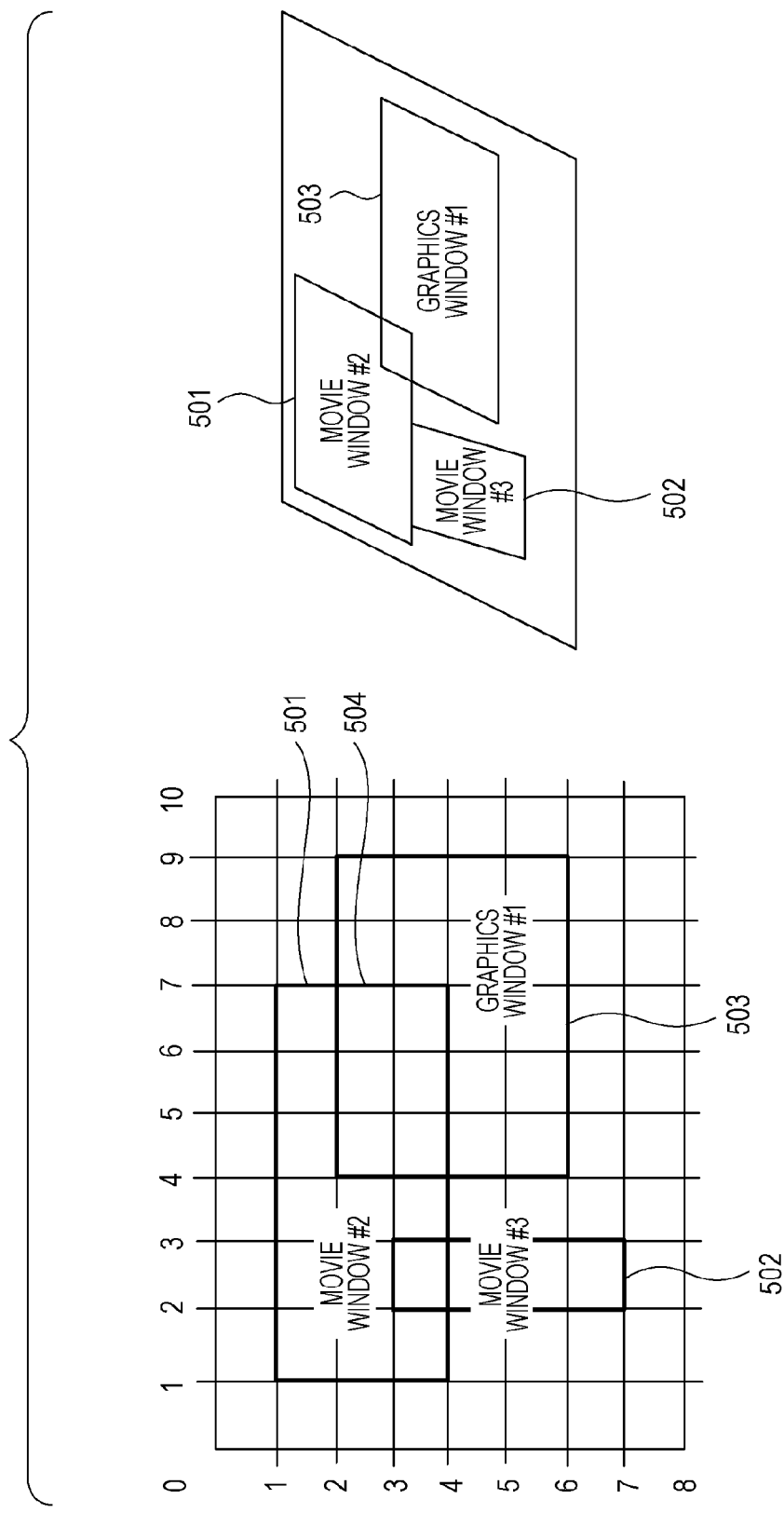

FIG. 6A

| ID | Z LEVEL | WINDOW COORDINATES | WINDOW SIZE | WINDOW TRANSPARENCY | NUMBER OF OVERLAP REGIONS | OVERLAP REGION COORDINATES | OVERLAP REGION SIZE | OVERLAP TRANSPARENCY |
|---|---|---|---|---|---|---|---|---|
| 10 | 2 | (4,2) | (5,4) | 0.5 | 0 | | | |
| 20 | 1 | (1,1) | (6,3) | 0 | 1 | (4,2) | (3,2) | 0.5 |
| 30 | 0 | (2,3) | (1,4) | 0 | 1 | (2,3) | (1,1) | 0 |

| ID | NUMBER OF OVERLAP REGIONS | LOCAL OVERLAP REGION COORDINATES | OVERLAP REGION SIZE | OVERLAP TRANSPARENCY |
|---|---|---|---|---|
| 10 | 0 | | | |
| 20 | 1 | (3,1) | (3,2) | 0.5 |
| 30 | 1 | (0,0) | (1,1) | 0 |

| ID | Z CONTROL FLAG | WINDOW COORDINATES AFTER CHANGE | WINDOW SIZE AFTER CHANGE | WINDOW TRANSPARENCY AFTER CHANGE |
|---|---|---|---|---|
| 10 | 1 | (1,1) | (6,3) | 0 |
| 608 | 901 | 902 | 903 | 904 |

FIG. 7B

| NUMBER OF OVERLAP REGIONS | OVERLAP TRANSPARENCY | LOCAL OVERLAP REGION COORDINATES | OVERLAP REGION SIZE | INPUT DEVICE TYPE |
|---|---|---|---|---|
| 1 | 0.5 | (3,1) | (3,2) | Char |
| 804 | 801 | 802 | 803 | 805 |

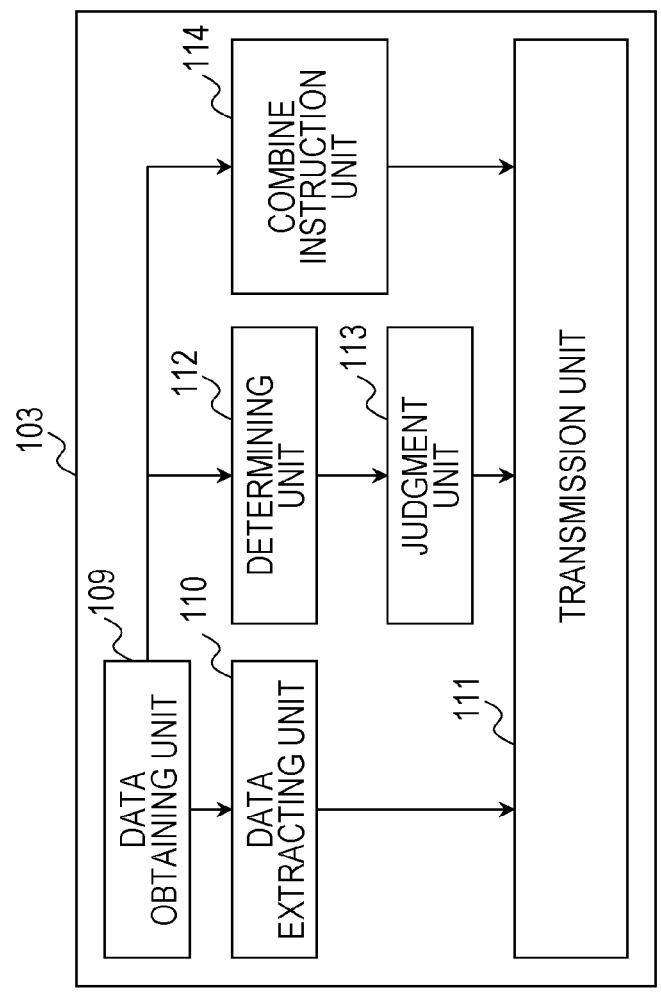

DISPLAY CONTROL APPARATUS AND METHOD FOR DISPLAYING OVERLAPPING WINDOWS

BACKGROUND OF THE INVENTION

1. Field of the Invention

The present invention relates to a display control apparatus and a display control method that display a plurality of windows in an overlapped manner.

2. Description of the Related Art

Currently, a system is generally used in which a plurality of different applications independently draw windows on a display screen of a personal computer, a digital home appliance, a mobile device, or the like. Nowadays, as a result of improvement in the graphics drawing performance, a system is also used in which a window is translucent so that drawing data drawn in a window on a lower layer is visible. In such a system, when a plurality of windows overlap, drawing data in a window on a lower layer is displayed in such a way as to be visible in a window on an upper layer.

As the system in which drawing data in a window on a lower layer is visible in a window on an upper layer, a technique has been disclosed in which, in view of making it possible to cause a window on a lower layer to be more visible, the transparency is adjusted on the basis of the type of drawing data in an overlap portion between a plurality of windows (for example, Japanese Patent Laid-Open No. 10-177466). Another technique has also been disclosed in which content to be displayed in a window on a lower layer is displayed in paler colors than content displayed on a window on an upper layer in a region in which the windows overlap (for example, Japanese Patent Laid-Open No. 08-123652).

SUMMARY OF THE INVENTION

However, in a region in which windows overlap, since a plurality of pieces of drawing data that have been drawn independently are displayed in an overlapped manner, the visibility might be decreased depending on the relationship between the display positions of the windows and the combination between the plurality of pieces of drawing data that have been drawn. FIGS. 2A and 2B illustrate examples in which translucent windows overlap. In the example illustrated in FIG. 2A, characters overlap in a portion of a display region, and therefore there are regions in which display content is hard to recognize in both a window on an upper layer with which a main operation is being performed and a window on a lower layer that overlaps the window on the upper layer. Similarly, as in the example illustrated in FIG. 2B, if an intricate figure such as one used in computer-aided design (CAD) or a map is edited in a window on an upper layer when similar figure data is displayed in a window on a lower layer, the visibility might be decreased due to an optical disturbance caused by mixed patterns.

An aspect of the present invention includes a detection unit configured to detect content of second drawing data drawn in a second window, which is displayed on a lower layer of a first window, and a display control unit configured to control display by determining, based on the content of the second drawing data drawn in the second window, whether to perform first control, in which the second drawing data is displayed in an overlap region, which is a region in which the first window and the second window overlap, in such a way as to be visible in the first window, or second control, in which the second drawing data drawn in the second window is not displayed in the overlap region or the second drawing data drawn in the second window is displayed in such a way as to be less visible in the first window than when the first control is performed.

According to the aspect of the present invention, it is possible to prevent a decrease in the visibility caused by drawing data in a window on a lower layer when the drawing data is visible in a window on an upper layer, thereby improving the visibility.

Further features of the present invention will become apparent from the following description of exemplary embodiments with reference to the attached drawings.

BRIEF DESCRIPTION OF THE DRAWINGS

FIG. 1B is a diagram illustrating an example of the configuration of display control apparatus configured as a device including a processor in the form of a CPU.

FIG. 2A is a diagram illustrating character data overlapped in an overlap region.

FIG. 2B is a diagram illustrating figure data overlapped in an overlap region.

FIG. 4 is a flowchart illustrating the operation of a management unit.

FIG. 5 is a diagram illustrating an example in which windows are displayed in a global coordinate system.

FIG. 6A is a diagram illustrating an example of a window management table according to the first embodiment.

FIG. 6B is a diagram illustrating an example of a local window management table according to the first embodiment.

FIG. 7A is a diagram illustrating an example of window control information.

FIG. 7B is a diagram illustrating an example of overlap region information.

FIG. 12 is a diagram illustrating an example of the configuration of the control unit according to a first embodiment.

DESCRIPTION OF THE EMBODIMENTS

Embodiments of the present invention will be described hereinafter with reference to the drawings.

First Embodiment

Figure 1A:
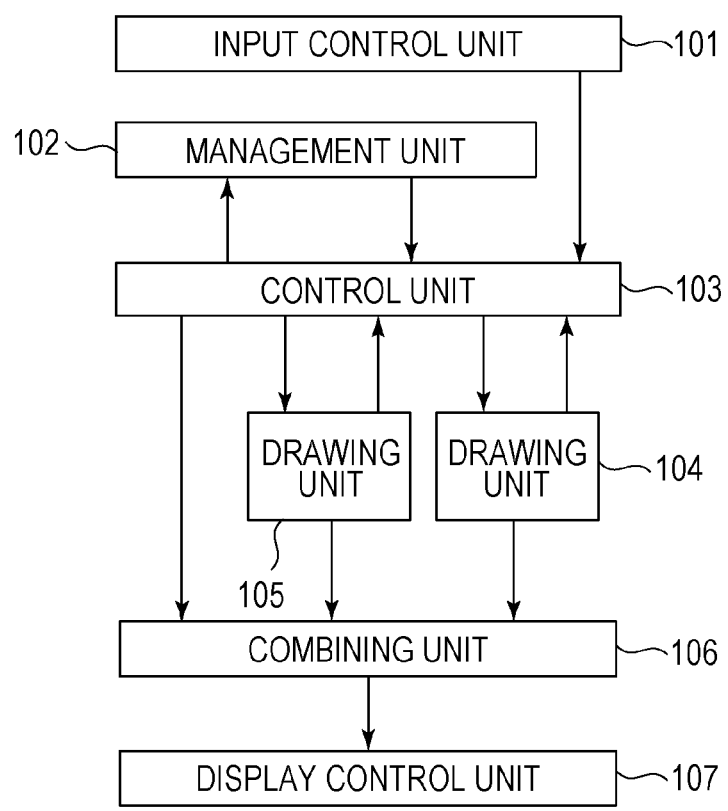
FIG. 1A is a diagram illustrating an example of the configuration of a display control apparatus according to a first embodiment of the present invention.

FIG. 1A illustrates a configuration for realizing a display control apparatus according to a first embodiment. Each component illustrated in FIG. 1A may be configured as physically independent hardware or as one or more instances of software having the same functions. For example, the display control apparatus may be configured as an Application Specific Integrated Circuit (ASIC) or other device including a processor in the form of a central processing unit (CPU), a micro processing unit (MPU), and/or the like.

FIG. 1B illustrates an example of the control apparatus configured as a device including a processor in the form of a CPU. In this CPU 123 executes the program read from a storage unit 108. The storage unit 108 is a storage medium that records the program which the CPU 123 can read. The storage unit 108 includes, for example, a ROM (Read Only Memory).

An input control unit 101 outputs drawing data input from an input apparatus, which is not illustrated, to a control unit 103, which will be described later. "Drawing data" herein refers to characters, figures, bitmap data, and the like to be drawn in a window displayed on a display screen of a display apparatus. Information indicating the attributes of drawing data, such as whether the drawing data is characters, a figure, bitmap data, or something else, is added to the drawing data.

In addition, the input control unit 101 obtains a device identification signal and outputs the device identification signal to the control unit 103. A "device identification signal" herein refers to a signal indicating a device that is being used by a user. For example, when the user is using a keyboard as an input apparatus, the input control unit 101 outputs, to the control unit 103, a device identification signal indicating that the user is using a character input device. The keyboard may be a soft keyboard, which is a set of keys displayed on the display screen. When the user is using a mouse, a touch panel, a tablet, or the like, the input control unit 101 outputs, to the control unit 103, a device identification signal indicating that the user is using a pointing device. The input control unit 101 thus identifies the type of input unit used to input drawing data to be drawn in a window.

A management unit 102 obtains, from the control unit 103, which will be described later, the positions and the sizes of windows displayed on the display screen of the display apparatus, the positions and the sizes of overlap regions in which a plurality of windows overlap, the number of overlap regions, Z levels, which indicate the hierarchy of the windows, and the transparency of the windows, and manages these pieces of information. Details of management of these pieces of information will be described with reference to FIGS. 5, 6A, and 6B.

A drawing unit 104 and a drawing unit 105 (hereinafter referred to as the "drawing units" as a generic term) generate drawing data, such as characters, figures, and the like, to be displayed in each window. The drawing units 104 and 105 may adopt a method in which the drawing units 104 and 105 are configured as drawing modules that operate in parallel with each other, as well as a software-like method in which a plurality of applications are used on a signal drawing module or processor as instances and drawing is performed in a sequential manner. In addition, the number of drawing modules may be set to any number in accordance with the characteristics of applications and the number of windows. The drawing data drawn in a plurality of windows by the drawing units 104 and 105 is input to a combining unit 106.

Figure 13A:
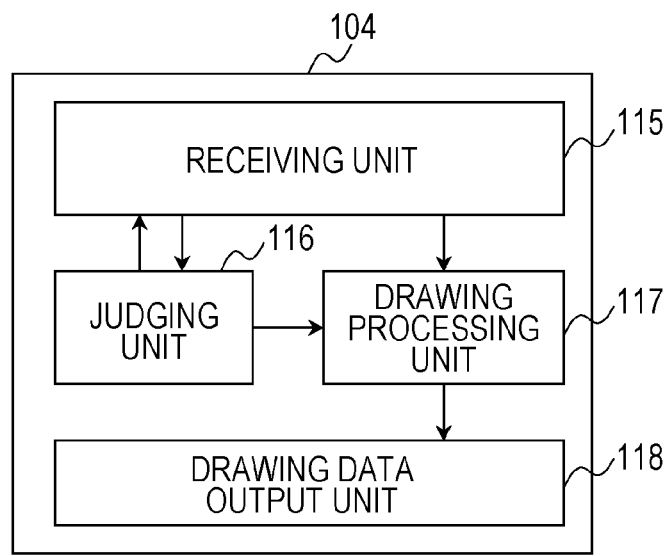
FIG. 13A is a diagram illustrating an example of the configuration of the drawing unit according to a first embodiment.
Figure 13B:
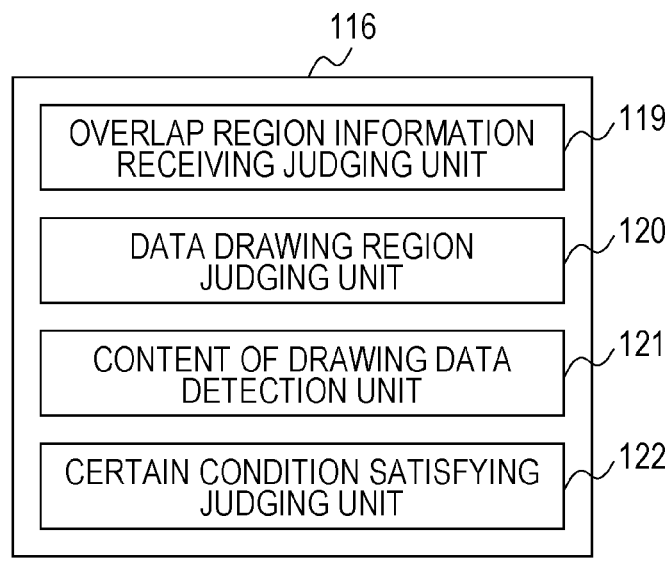
FIG. 13B diagram illustrating an example of the configuration of the judging unit according to a first embodiment.

FIG. 13A illustrates a configuration for realizing the drawing unit according to a first embodiment. FIG. 13B illustrates a configuration for realizing the judging unit 116 according to a first embodiment. Each unit illustrated in FIG. 13A and FIG. 13B may be configured as physically independent hardware or as one or more instances of software having the same functions.

The receiving unit 115 receives drawing data input from the control unit 103 which will be described later. In addition, the receiving unit 115 receives overlap region information, which will be described later.

The overlap region information receiving judging unit 119 in judging unit 116 judges whether or not the receiving unit 115 has received the overlap region information for a window for which the control unit 103 has instructed the drawing unit to draw the drawing data.

The data drawing region judging unit 120 in the judging unit 116 judges whether or not the drawing data is included in an overlap region.

The content of drawing data detection unit 121 in the judging unit 116 detects the content of drawing data. The content of drawing data herein refers to information regarding the attributes of the drawing data, such as whether the drawing data is characters or a figure, and the size of the drawing data. The method for detecting the content of drawing data is not particularly limited.

The certain condition satisfying judging unit 122 in judging unit 116 judges whether or not the content of the drawing data satisfies a certain condition.

The drawing processing unit 117 in drawing unit draws the drawing data.

The drawing data outputting unit 118 in drawing unit outputs the drawing data which is drawn by the drawing processing unit 117 to combining unit 106.

The combining unit 106 combines a plurality of windows drawn by the drawing units 104 and 105. Results of the combining performed by the combining unit 106 are input to a display control unit 107. The display control unit 107 causes the display apparatus to display the plurality of windows combined by the combining unit 106.

The control unit 103 controls the management unit 102, the drawing units 104 and 105, and the combining unit 106 using a device identification signal and input data received from the input control unit 101. Details of the control performed by the control unit 103 will be described later.

Next, information managed by the management unit 102 will be described with reference to FIGS. 5, 6A, and 6B. In this embodiment, the management unit 102 manages the positions and the sizes of windows on the display screen using a global coordinate system. In addition, the management unit 102 manages the positions and the sizes of overlap regions in each window region using local coordinate systems.

FIG. 5 illustrates an example of display of windows in the global coordinate system. In this embodiment, a window 501 and a window 502 are opaque, and a window 503 is translucent. In this embodiment, the Z level of a window drawn on a layer closest to the background is defined as 0. In the example of display illustrated in FIG. 5, the window 502 is drawn on a layer whose Z level is 0, the window 501 is drawn on a layer whose Z level is 1, and the window 503 is drawn on a layer whose Z level is 2.

FIG. 6A illustrates a window management table used by the management unit 102 to manage information regarding each window described with reference to FIG. 5. The window management table has, for each window, information regarding an identification (ID) 608 used to identify the window, a Z level 601, coordinates 602 of the window in the global coordinate system, a size 603, and transparency 604. The transparency of a window indicates how clearly drawing data displayed in a window on a lower layer can be seen in the window in question. In this embodiment, the transparency is 0 when a window is opaque and 0.5 when a window is translucent. In addition, the window management table has, for each overlap region, which is a region in a certain window and in which another window on an upper layer is overlapping the window in question, information regarding coordinates 605 and a size 606 of the overlap region, overlap transparency 609, which is the transparency of the upper window, and the number 607 of overlap regions.

For example, in the window management table illustrated in FIG. 6A, the window 501 is expressed as an entry whose ID is 20. In this embodiment, the coordinates of the upper left corner of a window are used as the coordinates of a window. The coordinates of the window 501 are (1, 1). In addition, the size of the window 501 is (6, 3), which means that the window 501 has a width of 6 and a length of 3 in a scale. The sizes of windows will be expressed hereinafter in the same manner. As described above, since the window 501 is opaque, the transparency of the window 501 is 0. In addition, since the window 503, which is translucent, overlaps the window 501, the number of overlap regions is 1. The coordinates of an overlap region 504 between the window 501 and the window 503 is expressed as (4, 2) in the global coordinate system. In addition, the size of the overlap region 504 is expressed as (3, 2). In addition, since the transparency of the window 503, which overlaps the window 501 on an upper layer of the window 501, is 0.5, the overlap transparency is expressed as 0.5.

The window 502 is expressed as an entry whose ID is 30 in the window management table. Each piece of information regarding the window 502 is held by the window management table in the same manner as in the case of the window 501.

The window 503 is expressed as an entry whose ID is 10 in the window management table. The window 503 is opaque and the transparency of the window 503 is 0.5. Because the window 503 is a top window and therefore there is no other window that overlap the window 503 on an upper layer, the number of overlap regions is 0.

Next, FIG. 6B illustrates a local window management table used by the management unit 102 to manage the position of an overlap region and the like in each window region. The local window management table has information regarding the ID 608, the overlap transparency 609, local overlap region coordinates 703, a local overlap region size 704, and the number 607 of overlap regions.

Information regarding the size 606 of the overlap region, the number 607 of overlap regions, the overlap transparency 609, and the ID 608 is the same as that recorded on the window position table illustrated in FIG. 6A, and therefore description thereof is omitted by attaching the same reference numerals.

The local overlap region coordinates 703 represent the position of an overlap region using a local coordinate system for each window. In this embodiment, the coordinates 602 of each window are assumed to be the origin (0, 0) of each local coordinate system.

In this embodiment, for example, the origin of a local coordinate system of the window 501, whose ID is 20, is (1, 1) in the global coordinate system. In addition, the coordinates of the overlap region 504, in which the window 503 overlaps the window 501, are (4, 2) in the global coordinate system. The local overlap region coordinates of the window 501 are expressed as (4−1, 2−1)=(3, 1) in the local coordinate system.

In addition, the origin of a local coordinate system of the window 502, whose ID is 30, is (2, 3) in the global coordinate system. In addition, the coordinates of the overlap region in which the window 501 overlaps the window 502, too, are (2, 3) in the global coordinate system. The local overlap region coordinates of the window 502 are expressed as (2−2, 3−3)= (0, 0) in the local coordinate system.

The position of the origin of a local coordinate system is not limited to the coordinates 602 of a window. The origin of each local coordinate system may be arbitrarily set and information regarding the origin of each local coordinate system may be held in the entry of each window in the window management table. In this case, the position of an overlap region in a local coordinate system can be obtained using the values of the coordinates of the overlap region in the global coordinate system and the information regarding the origin. The management unit 102 thus manages the above-described information regarding windows and overlap regions. The management unit 102 thus manages the positions and the sizes of windows, the positions and the sizes of overlap regions in the windows, the number of overlap regions, the hierarchy of the windows, and the transparency of the windows.

Next, the content of drawing instruction control performed by the control unit 103 will be described. FIG. 12 illustrates a configuration for realizing the control unit 103 according to a first embodiment. Each unit illustrated in FIG. 12 may be configured as physically independent hardware or as one or more instances of software having the same functions.

The data obtaining unit 109 obtains a device identification signal and input data received from the input control unit 101.

The data extracting unit 110 in the control unit 103 extracts information regarding a change in the position of a window and a change in the size of the window from data input from the input control unit 101.

The transmission unit 111 transmits the information to the management unit 102 as window control information. Upon receiving the window control information, the management unit 102 updates the window management table illustrated in FIG. 6A and the local window management table illustrated in FIG. 6B on the basis of the window control information. The window control information will be described with reference to FIG. 7A.

The window control information has information regarding the ID 608, a Z control flag 901, coordinates 902 of the window after the change, a size 903 of the window after the change, transparency 904 of the window after the change. The Z control flag 901 is used to change the display position of a window to the top. When the Z control flag is 1, the window is displayed at the top. The control unit 103 transmits the coordinates 902 of the window after the change as the target coordinates of the window. In addition, the control unit 103 transmits the size 903 of the window after the change as the target size of the window. Furthermore, the control unit 103 transmits the transparency 904 of the window after the changes as the target transparency of the window.

Upon obtaining drawing data from the input control unit 101, the determining unit 112 in the control unit 103 determines a drawing unit that is to draw the obtained drawing data and issues a drawing instruction to the selected drawing unit through the transmission unit 111. The determining unit 112 instructs the drawing unit to draw a window in accordance with a change in the position, the size, or the transparency of the window or the like. When issuing the drawing instruction, the determining unit 112 transmits overlap region information to the drawing unit through the transmission unit 111. FIG. 7B illustrates an example of the overlap region information. The determining unit 112 transmits overlap transparency 801, coordinates 802 of the overlap region, a size 803 of the overlap region, the number 804 of overlap regions, and a type 805 of input device as the overlap region information through the transmission unit 111. The determining unit 112 transmits the overlap region information illustrated in FIG. 7B through the transmission unit 111 by reading, from the local window management table illustrated in FIG. 6B, the number 607 of overlap regions, the local overlap region coordinates 703, the size 606 of the overlap region, the overlap transparency 702 of a window for which the drawing data is to be drawn.

The judgment unit 113 in the control unit 103 judges attributes of drawing data based on a type of input device. The judgment unit 113 adds a character string "Char", which indicates a character input device, or "Pont", which indicates a pointing device, to the type 805 of input device in the overlap region information on the basis of the device identification signal received from the input control unit 101.

The determining unit 112 also inputs the drawing data to the drawing unit through the transmission unit 111. In addition, upon receiving a notification indicating that drawing has been completed from the drawing unit, the combine instruction unit 114 in the control unit 103 instructs the combining unit 106 to combines windows through the transmission unit 111.

Figure 3:
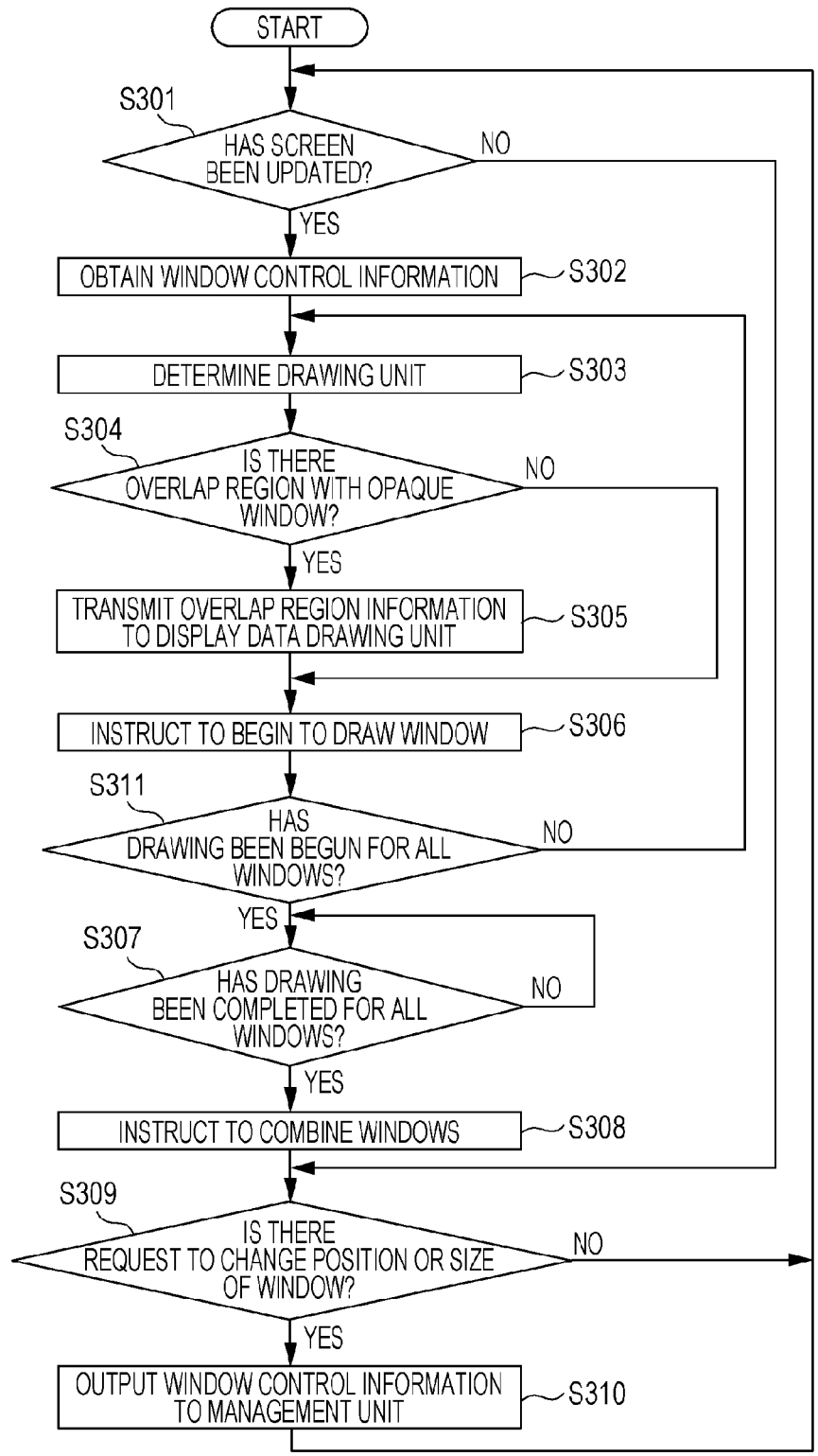
FIG. 3 is a flowchart illustrating the operation of a control unit.

Next, the operation of the control unit 103 according to this embodiment will be described with reference to a flowchart illustrated in FIG. 3. In an embodiment in which the functions of the control unit 103 are realized using a processor and a memory, the flow of a process illustrated in FIG. 3 is realized by a program for causing the processor to execute a procedure illustrated in FIG. 3. The processor is a computer and executes a program read from the memory. The memory is a recording medium on which the program has been recorded so that the processor can read the program.

First, the control unit 103 waits for the timing at which update of the screen is begun (S301). The timing at which update of the screen is begun may be, for example, reception of an instruction to update the screen from an application program, which is not illustrated, reception of an instruction to operate the window from the input control unit 101, or the like. If the update of the screen has been begun (YES in S301), the control unit 103 obtains information regarding the window to be updated stored in a local window management table of the management unit 102 illustrated in FIG. 6B (S302).

The control unit 103 then determines a drawing unit that is to draw the window for which an instruction to change the display position or the size has been issued (S303). Any method may be used to determine a drawing unit. The method for determining a drawing unit is not essential to the present invention, and therefore description thereof is omitted.

Next, the control unit 103 judges whether or not there is an overlap region with an opaque window in the region of the window for which a drawing unit has been determined (S304). The judgment is made on the basis of the number 607 of overlap regions and the overlap transparency 609 illustrated in FIG. 6B that have been obtained in step S302. The control unit 103 judges that there is an overlap region with an opaque window in the window if the number 607 of overlap regions is larger than 0 and the overlap transparency 609 is larger than 0. If there is no overlap region with an opaque window (NO in S304), the process proceeds to step S306, which will be described later.

If it has been judged that there is an overlap region with an opaque window (YES in S304), the control unit 103 transmits the overlap region information illustrated in FIG. 7 to the drawing unit selected in step S303 (S305).

Next, the control unit 103 instructs the drawing unit selected in step S303 to begin to draw a window (S306). The control unit 103 then judges whether or not a process for beginning the drawing has been performed for all windows for which an instruction to change the display position or the size has been issued (S311). If there is a window for which the process for beginning the drawing has not been performed (NO in S311), the processes in steps S303 to S311 are repeated.

If the drawing has begun for all the windows (YES in S311), the control unit 103 judges whether or not all drawing units activated by the instruction to begin the drawing have completed the drawing of the windows (S307). The completion of the drawing of the windows is detected by receiving drawing completion notifications, which will be described later, from the drawing units.

Next, the control unit 103 specifies combining parameters and instructs the combining unit 106 to begin the combining, in order to combine the plurality of windows that have been drawn (S308). The drawing process for one frame is thus completed.

The control unit 103 judges whether or not a request to change the position or the size of a window is included in the data input from the input control unit 101 (S309). If there is no request to change the position or the size of a window, the process returns to step S301 and waits for the next update of the screen. If there is a request to change the position or the size of a window, the control unit 103 outputs the window control information illustrated in FIG. 7A to the management unit 102 (S310).

Next, the operation of the management unit 102 will be described with reference to a flowchart illustrated in FIG. 4. In an embodiment in which the functions of the management unit 102 are realized using a processor and a memory, the flow of a process illustrated in FIG. 4 is realized by a program for causing the processor to execute a procedure illustrated in FIG. 4. The processor is a computer and executes a program read from the memory. The memory is a recording medium on which the program has been recorded so that the processor can read the program.

First, the management unit 102 judges whether or not the management unit 102 has received an instruction regarding a change in the position or the size of a window or the like from the control unit 103 (S401). In this embodiment, the management unit 102 judges that the management unit 102 has received an instruction regarding a change in the position or the size of a window or the like when the management unit 102 has received the window control information illustrated in FIG. 7A from the control unit 103.

If the management unit 102 has received an instruction regarding a change in the position or the size of a window or the like (YES in S401), the management unit 102 updates the position or the size of the window or the like (S402). The content to be updated is not limited to the position or the size of a window. For example, when the Z control flag 901 has instructed the management unit 102 to change the order in which windows overlap, the management unit 102 updates the Z levels in the window management table illustrated in FIG. 6A in order to change the hierarchy of the windows. When the transparency of a window has been changed, the value of the transparency 604 is updated.

Next, in steps S403 to S410, the management unit 102 updates the coordinates 605 of overlap regions, the sizes 606 of the overlap regions, and the number 607 of overlap regions in the window management table illustrated in FIG. 6A.

The management unit 102 specifies a window whose Z level 601 is 0 as "current" (S403). The management unit 102 then judges whether or not the Z level of the window specified as "current" (hereinafter referred to as the "current window") is the largest (S404).

If there is a window having a Z level larger than that of the current window (NO in S404), the management unit 102 sets a comparison window for judging whether or not there is an overlap region with the current window (S405). In step S405, the management unit 102 sets a window located one layer higher than the current window as the comparison layer. For example, if the Z level of the current window is 0, a window whose Z level is 1 is first set as the comparison window.

The management unit 102 judges whether or not there is an overlap region between the current window and the comparison window (S406). The judgment whether or not there is an overlap region can be made by, for example, judging whether or not a part or the entirety of the comparison window is included in a region of the current window identified by the coordinates 602 and the size 603 of the window in the window management table illustrated in FIG. 6A.

If there is an overlap region between the windows (YES in S406), the management unit 102 increases the number 607 of overlap regions of the current window by 1, and then updates the coordinates 605 and the sizes 606 of the overlap regions (S407). The management unit 102 then sets a window whose Z level is larger than that of the current comparison window by 1 as a new comparison window (S408). If there is no overlap region (NO in S406), the management unit 102 executes the process in step S408 without executing the process in step S407.

Next, the management unit 102 judges whether or not the comparison window newly set in step S408 actually exists (S409). If the comparison window having a newly set Z level exists (YES in S409), the management unit 102 repeats steps S406 to S408. If the window corresponding the newly set Z level does not exist (NO in S409), the management unit 102 changes the current window to a window whose Z level is larger by 1 (S410), and then repeats steps S404 to S409.

If the current window is the top window (YES in S404), the management unit 102 judges whether or not the management unit 102 has received a request for the window control information from the control unit 103 (S411). If the management unit 102 has received a request for the window control information from the control unit 103, the management unit 102 calculates the local overlap region coordinates 703 in the window control information on the basis of the coordinates 605 of the overlap regions in the window management table illustrated in FIG. 6A, and then generates the overlap region information illustrated in FIG. 7B and transmits the overlap region information to the control unit 103 (S412).

Figure 8:
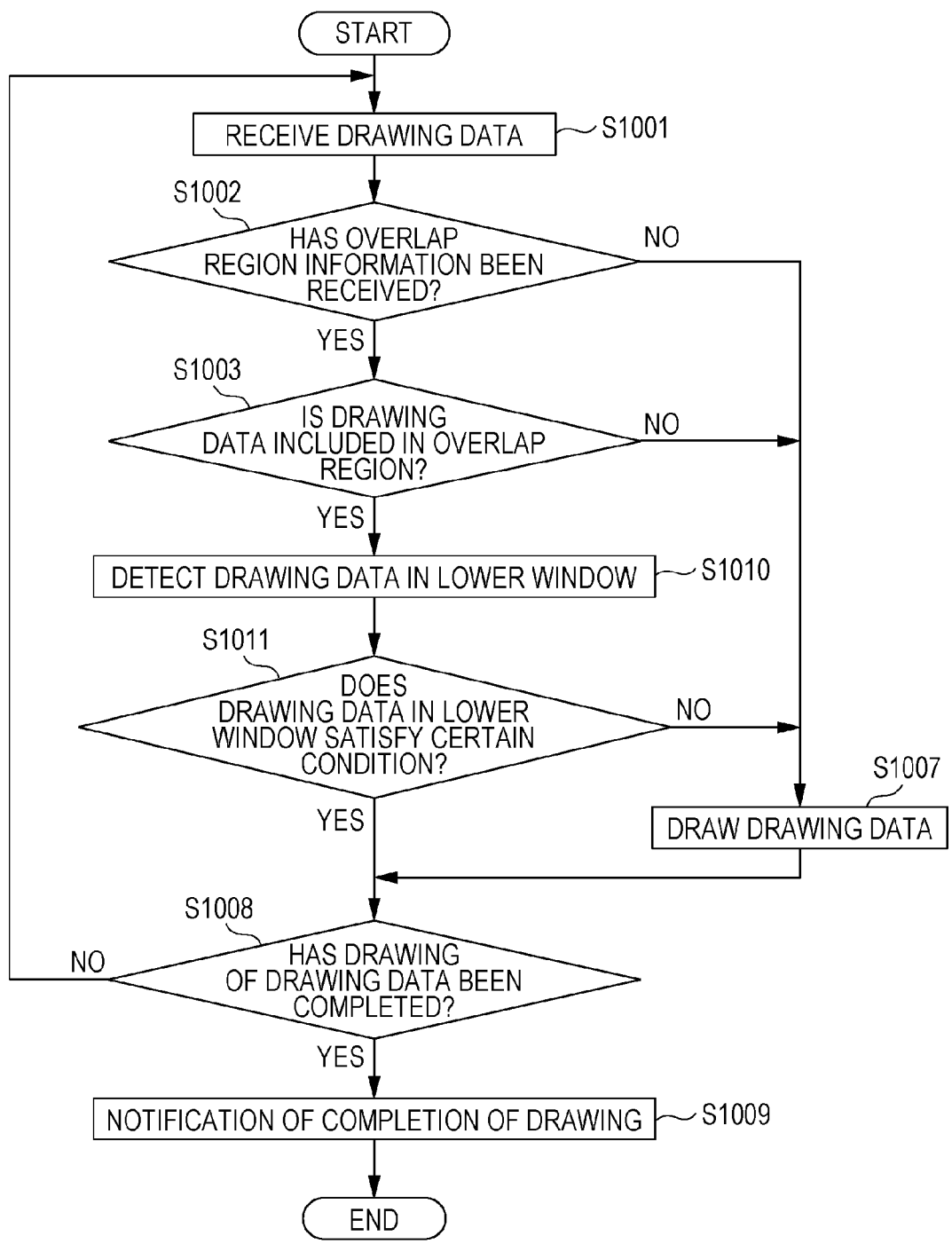
FIG. 8 is a flowchart illustrating the operation of drawing units.

Next, the operation of the drawing units will be described with reference to a flowchart illustrated in FIG. 8. In the embodiment in which the functions of the control unit 103 are realized using a processor and a memory, the flow of a process illustrated in FIG. 8 is realized by a program for causing the processor to execute a procedure illustrated in FIG. 8. The processor is a computer and executes a program read from the memory. The memory is a recording medium on which the program has been recorded so that the processor can read the program.

First, a drawing unit receives drawing data input from the control unit 103 (S1001). Next, the drawing unit judges whether or not the drawing unit has received the overlap region information illustrated in FIG. 7B for a window for which the control unit 103 has instructed the drawing unit to draw the drawing data (S1002). If overlap region information corresponding to an ID of the window for which drawing has been instructed has not been received (NO in S1002), the drawing unit performs the drawing process in accordance with the instruction to draw the drawing data (S1007). If overlap region information corresponding to an ID of the window for which drawing has been instructed has been received (YES in S1002), the drawing unit judges whether or not the drawing data is included in an overlap region (S1003).

In this embodiment, the judgment in step S1003 is made on the basis of information regarding the coordinates 802 and the sizes 803 of overlap regions included in the overlap region information illustrated in FIG. 7B. By comparing these pieces of information and local coordinates of the drawing data in the window, the judgment in step S1003 can be made. If the drawing data is not included in an overlap region (NO in S1003), the process proceeds to step S1007 and the drawing unit draws the drawing data.

If the drawing data is included in an overlap region (YES in S1003), the drawing unit detects the content of drawing data drawn in a window on a lower layer (S1010). The content of drawing data herein refers to information regarding the attributes of the drawing data, such as whether the drawing data is characters or a figure, and the size of the drawing data. The method for detecting the content of drawing data is not particularly limited. When the control unit 103 inputs the instruction to draw the drawing data to the drawing unit, the control unit 103 may also input information indicating the content of the drawing data to the drawing unit. Alternatively, the drawing unit may analyze the drawing data that the control unit 103 has instructed the drawing unit to draw and detect the content of the drawing data.

Next, the drawing unit judges whether or not the content of the drawing data drawn in the window on the lower layer satisfies a certain condition (S1011). The content of the judgment made in step S1011 will be described with reference to FIGS. 9 to 11.

If the drawing unit has judged in step S1011 that the certain condition is not satisfied, the process proceeds to step S1007 and the drawing unit draws the drawing data drawn in the window on the lower layer. That is, the drawing unit displays the drawing data in the window on the lower layer such that the drawing data is visible in the window on an upper layer.

On the other hand, if the drawing unit has judged in step S1011 that the certain condition is satisfied, the process proceeds to step S1008 without the drawing unit drawing the drawing data. That is, the drawing unit causes the drawing data drawn in the window on the lower layer not to be displayed in the overlap region.

In step S1008, the drawing unit judges whether or not one frame of the input drawing data has been completed. If one frame has not been completed, the process returns to step S1001 and processing of the next drawing data is performed. If the completion of the drawing of one frame has been detected, the drawing unit notifies the control unit 103 of the completion of one frame in step S1009.

As described above, the control unit 103 waits for the completion of the operation of all the drawing units and outputs an instruction to combine the drawing data and display the drawing data on the screen to the combining unit 106.

The combining unit 106 combines the current window and the window on the upper layer drawn by the drawing unit as described above. Results of the combining of the windows performed by the combining unit 106 are input to the display control unit 107. The display control unit 107 displays the plurality of windows combined by the combining unit 106 on the display apparatus.

Thus, the display control apparatus according to this embodiment of the present invention determines, on the basis of the content of drawing data drawn in a window on a lower layer, whether to perform first control, in which the drawing data in the window on the lower layer is displayed in an overlap region such that the drawing data is visible in a window on an upper layer, or second control, in which the drawing data drawn in the window on the lower layer is not displayed in the overlap region.

Thus, in a case in which the visibility in the overlap region would be decreased if the drawing data in the window on the lower layer is displayed in the overlap region, the display control apparatus according to this embodiment of the present invention can cause the drawing data in the window on the lower layer not to be displayed. Therefore, it is possible to prevent a decrease in the visibility of the drawing data displayed in the overlap region. In addition, when there is no fear of the visibility being decreased, the display control apparatus according to this embodiment of the present invention can display the drawing data drawn in the window on the lower layer in the overlap region such that the drawing data is visible in the window on the upper layer. Thus, it is possible to increase the amount of information to be displayed on the display screen on which the windows are displayed.

Figure 9:
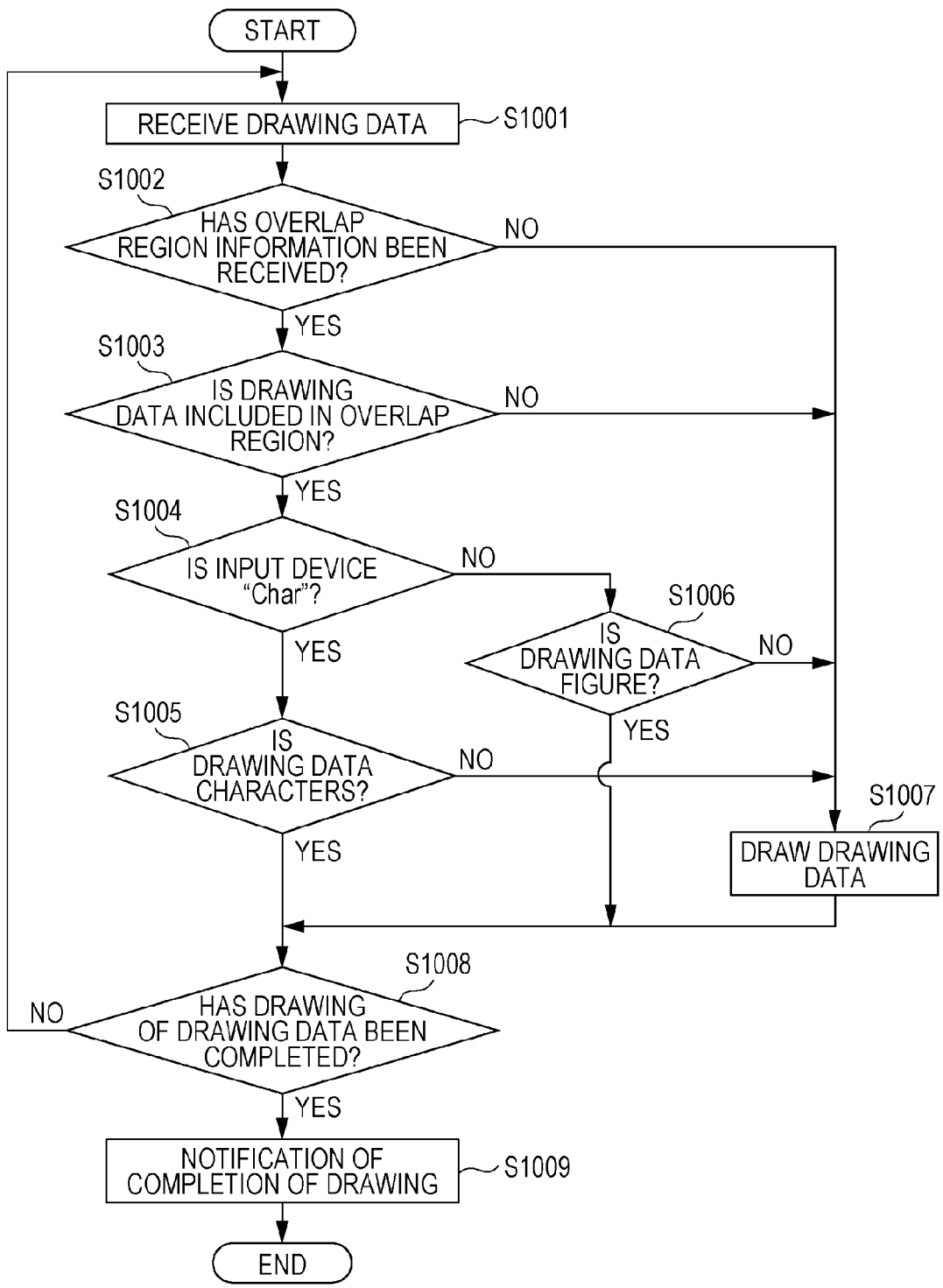
FIG. 9 is a flowchart illustrating the operation of drawing units according to the first embodiment.

Next, details of the operation of the drawing units according to this embodiment will be described with reference to FIG. 9. In the embodiment in which the functions of the control unit 103 are realized using a processor and a memory, the flow of a process illustrated in FIG. 9 is realized by a program for causing the processor to execute a procedure illustrated in FIG. 9. The processor is a computer and executes a program read from the memory. The memory is a recording medium on which the program has been recorded so that the processor can read the program.

In the flow of the process illustrated in FIG. 9, the processes in step S1001 to S1003 are the same as those described with reference to FIG. 8, and therefore description thereof is omitted by attaching the same reference numerals.

If a drawing unit has judged in step S1003 that the drawing data is included in an overlap region, the drawing unit then refers to the type 805 of input device included in the overlap region information illustrated in FIG. 7B in order to judge the type of input device (S1004). In this embodiment, the drawing unit judges whether the input device is a device used to input characters, such as a keyboard or a soft keyboard, or a device mainly used to input figures, such as a mouse. In this embodiment, the drawing unit judges the type of input device in order to judge whether the drawing data that is being input to the window on the upper layer is characters or a figure. The drawing unit thus judges the attributes of the drawing data drawn in the window displayed on a layer superior to the current window on the basis of the type of input device identified by the input control unit 101.

If the type of input device is one for inputting characters (YES in S1004), the visibility has priority and the process (S1007) for drawing character drawing data is not performed in the window on the lower layer, since it is highly probable that the type of drawing data that is being input to the window on the upper layer is characters. If the type of input device is one for inputting characters (YES in S1004), the drawing unit judges whether or not the drawing data drawn in the window on the lower layer is characters on the basis of the attributes of the drawing data (S1005). If the drawing data drawn in the window on the lower layer is characters (YES in S1005), the drawing unit performs the process in step S1008, which will be described later, without performing the process (S1007) for drawing the character drawing data. On the other hand, if the drawing data drawn in the window on the lower layer is not characters (NO in S1005), the drawing data draws the drawing data (S1007).

If the type of input device is not one for inputting characters (NO in S1004), the visibility has priority and the process (S1007) for drawing figure drawing data in the window on the lower layer is not performed, since it is highly probable that the type of drawing data that is being input to the window on the upper layer is a figure. If the type of input device is not one for inputting characters (NO in S1004), the drawing unit judges whether or not the drawing data drawn in the window on the lower layer is a figure on the basis of the attributes of the drawing data (S1006). If the drawing data drawn in the window on the lower figure is a character (YES in S1006), the drawing unit performs the process in step S1008, which will be described later. On the other hand, if the drawing data drawn in the window on the lower layer is not a figure (NO in S1006), the drawing unit draws the drawing data (S1007). As described with respect to steps S1005 and S1006, the drawing unit judges the attributes of the drawing data drawn in the current window.

Thus, when the attributes of drawing data drawn in the current window and the attributes of drawing data drawn in a window displayed on an upper layer are different from each other, the display control unit 107 displays the drawing data drawn in the current window in an overlap region such that the drawing data is visible in the window on the upper layer. In addition, if the attributes of the drawing data drawn in the current window and the attributes drawn in the window on the upper layer are the same, the display control unit 107 causes the drawing data drawn in the current window not to be displayed in the overlap region.

In step S1008, the drawing unit judges whether or not one frame of the input drawing data has been completed. If one frame has not been completed, the process returns to step S1001 and processing of the next drawing data is performed. If the completion of the drawing of one frame has been detected, the drawing unit notifies the control unit 103 of the completion of one frame in step S1009.

According to this embodiment of the present invention, when the attributes of drawing data in a window on a lower layer and the attributes of drawing data in a window on an upper layer are the same, the drawing data in the window on the lower layer is displayed in an overlap region between the windows in such a way as to be visible in the window on the upper layer. Therefore, in comparison with a system that displays only opaque windows, the amount of information to be displayed on the screen is increased, thereby improving the work efficiency. On the other hand, when the attributes of the drawing data of the windows are different from each other, the drawing data in the window on the lower layer is not drawn in the overlap region. Therefore, a decrease in the visibility in the overlap region due to an optical disturbance caused by mixed characters or patterns can be prevented, thereby improving the visibility. Furthermore, in this embodiment, since the drawing data in the window on the lower layer is not drawn in the overlap region when the attributes of the drawing data of the windows are different from each other, it is possible to reduce loads caused by image processing and a drawing process that are necessary to configure the drawing data. As a result of the reduction in loads caused by the drawing process, the drawing speed of the screen can be expected to increase.

In this embodiment, the attributes of the drawing data drawn in the window on the upper layer are judged on the basis of the type of input apparatus. Therefore, it is possible to appropriately select whether or not to cause the drawing data in the window on the lower layer to be visible in the overlap region in the window on the upper layer in accordance with the current input state of the drawing data. Therefore, the visibility of characters is increased when the characters are input and that of figures is increased when the figures are input. In addition, it is possible to refer to figures in the window on the lower layer when characters are input and characters in the window on the lower layer when figures are input, thereby improving the work efficiency.

In the first embodiment, when the attributes of the drawing data drawn in the current window and the attributes of the drawing data drawn in the window on the upper layer are the same (YES in S1005 or S1006), the drawing unit causes the drawing data in the current window not to be displayed in the overlap region. However, the display control method in the overlap region when the attributes of the drawing data are the same is not limited to this. For example, in another case, the drawing unit may draw the drawing data in the current window such that the drawing data is less visible in the window on the upper layer than when the attributes of the drawing data in the current window and the attributes of the drawing data in the window on the upper layer are different from each other. Upon receiving results of the drawing performed by the drawing unit, the display control unit 107 displays the drawing data in the current window such that the drawing data is less visible in the window on the upper layer than when the attributes of the drawing data in the current window and the attributes of the drawing data in the window on the upper layer are different from each other. In such a configuration, too, as in the first embodiment, when the attributes of the drawing data of the windows are different from each other, it is possible to prevent a decrease in the visibility in the overlap region due to an optical disturbance caused by mixed characters or patterns, thereby improving the visibility. In addition, since the attributes of the drawing data drawn in the window on the upper layer are judged on the basis of the type of input apparatus, it is possible to appropriately select whether or not to cause the drawing data in the window on the lower layer to be visible in the overlap region in the window on the upper layer in accordance with the current input state of the drawing data.

In addition, the attributes of the drawing data may be judged for each window. Alternatively, a window may be divided into a plurality of regions and the attributes of the drawing data may be judged for each region. By judging the attributes for each region obtained as a result of the division, it is possible to judge the attributes of the drawing data in the overlap region more accurately than when the attributes are judged on a window-by-window basis. On the other hand, when the attributes of the drawing data are judged on a window-by-window basis, it is possible to reduce processing loads for the judgment, thereby increasing the drawing speed.

Second Embodiment

In this embodiment, a case will be described in which whether or not drawing data in a window on a lower layer is visible in an overlap region in a window on an upper layer is determined on the basis of the size of the drawing data drawn in the window on the lower layer.

In this embodiment, upon obtaining drawing data from the input control unit 101 as in the first embodiment, the control unit 103 determines a drawing unit that is to draw the obtained drawing data and instructs the selected drawing unit to draw the drawing data. The control unit 103 issues the instruction to draw a window in accordance with a change in the position, the size, and the transparency of the window or the like. When issuing the instruction to draw a window, the control unit 103 transmits overlap region information to the drawing unit. At this time, the control unit 103 according to this embodiment does not transmit information regarding the type of input device in the overlap region information illustrated in FIG. 7B.

In addition, in this embodiment, the drawing unit changes the transparency of the window on the upper layer on the basis of the size of the drawing data drawn in the window on the lower layer, as will be described later with reference to FIGS. 10 and 11.

The operation of the control unit 103 according to the second embodiment is the same as that described with reference to FIG. 3, and therefore description thereof is omitted. In addition, the operation of the management unit 102 is the same as that described with reference to FIG. 4, and therefore description thereof is omitted.

Next, the operation of drawing units according to this embodiment will be described with reference to a flowchart illustrated in FIG. 10. In the embodiment in which the functions of the control unit 103 are realized using a processor and a memory, the flow of a process illustrated in FIG. 10 is realized by a program for causing the processor to execute a procedure illustrated in FIG. 10. The processor is a computer and executes a program read from the memory. The memory is a recording medium on which the program has been recorded so that the processor can read the program.

Figure 10:
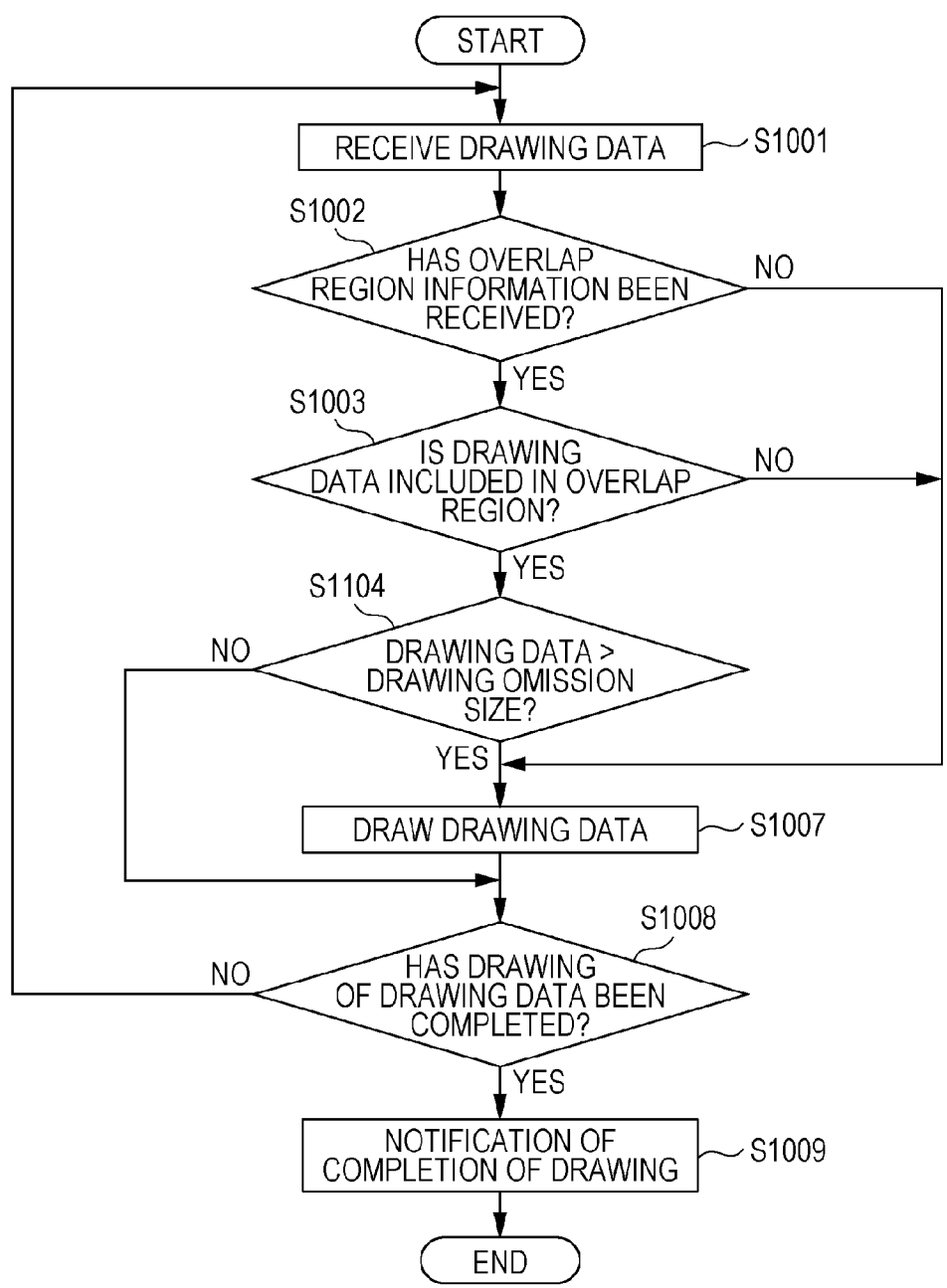
FIG. 10 is a flowchart illustrating the operation of drawing units according to a second embodiment.
Figure 11:
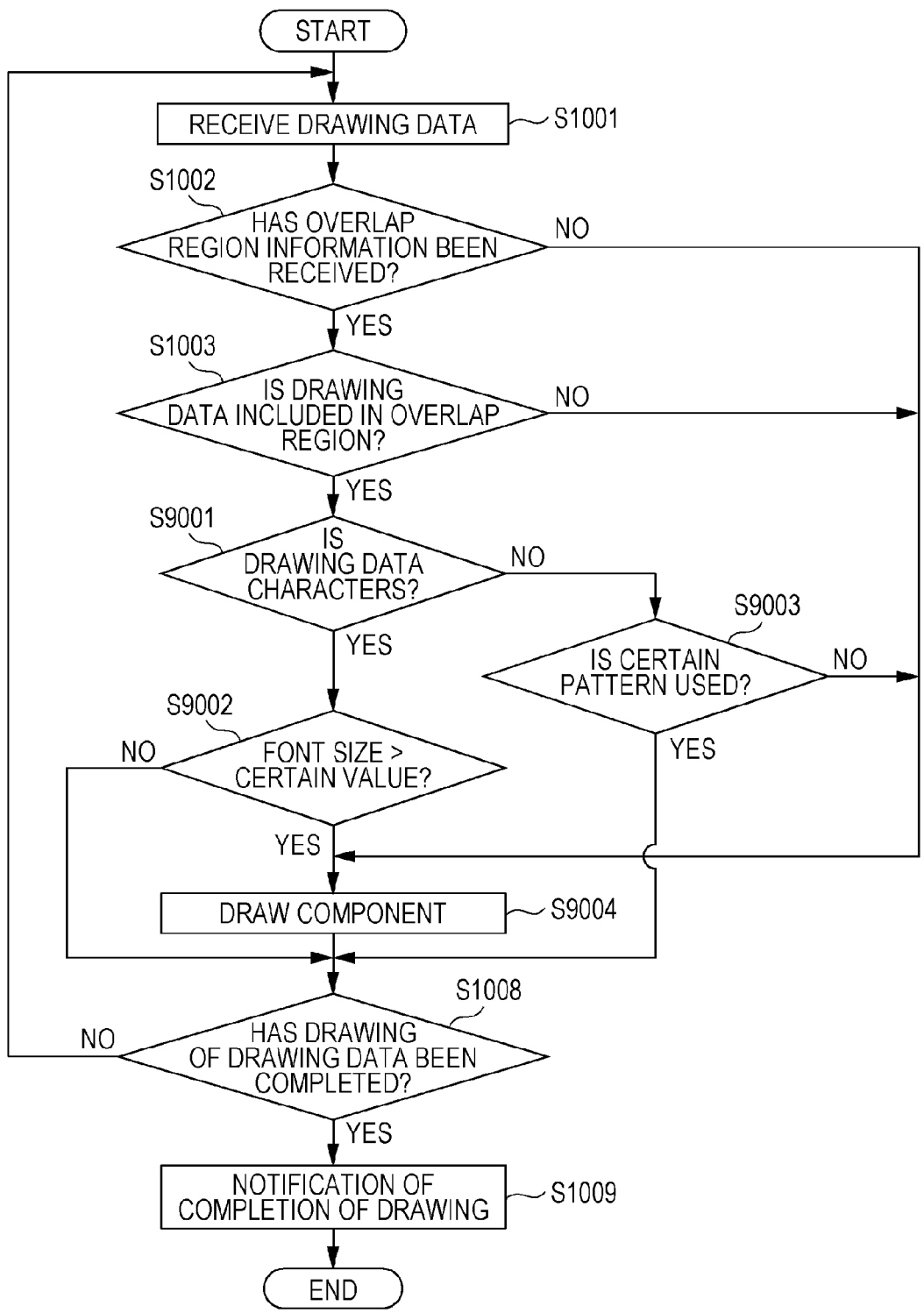
FIG. 11 is a flowchart illustrating the operation of drawing units according to a third embodiment.

In FIG. 10, the processes in step S1001 to S1003 are the same as those described with reference to FIG. 8 for the configuration illustrated in FIG. 1A, and therefore description thereof is omitted by attaching the same reference numerals for the steps.

If the drawing data is included in an overlap region (YES in S1003), the drawing unit judges whether or not the size of a display region of the drawing data is larger than a drawing omission size, which is a certain size (S1104). If the size of the display region of the drawing data is larger than the drawing omission size (YES in step S1104), the drawing data draws the drawing data (S1005). If the size of the display region of the drawing data is equal to or smaller than the drawing omission size (NO in step S1104), the drawing unit judges whether or not the drawing of the drawing data has been completed (S1008). Thus, the drawing unit determines whether or not to cause the drawing data in the window on the lower layer to be visible in the overlap region in the window on the upper layer in accordance with results of the judgment made in step S1104.

In step S1008, the drawing unit judges whether or not one frame of the input drawing data has been completed. If one frame has not been completed, the process returns to step S1001 and processing of the next drawing data is performed. If the completion of the drawing of one frame has been detected in step S1008, the drawing unit notifies the control unit 103 of the completion of one frame in step S1009.

In the above example, if there is an overlap region, the drawing unit invariably judges in step S1003 whether or not the drawing data is included in the overlap region. However, the present invention is not limited to this. For example, if it has been judged that there is an overlap region (YES in S1002), the drawing unit may judge whether or not the overlap transparency 801 illustrated in FIG. 7B is equal to or larger than a certain value of transparency. For example, the certain value of transparency may be 0.3. If the overlap transparency 801 is smaller than the certain value of transparency, the process proceeds to step S1005 and the drawing data is drawn. On the other hand, if the overlap transparency 801 is equal to or larger than the certain value of transparency, the process may proceed to step S1003 and the drawing unit may judge whether or not the drawing data is included in the overlap region.

Thus, if the transparency is low and accordingly the probability that the drawing data in the window on the lower layer decreases the visibility of the drawing data in the window on the upper layer is low, it is possible not to perform the drawing omission process.

As described above, the control unit 103 waits for completion of the process performed by all the drawing units and outputs an instruction to combine the drawing data and display the drawing data on the screen to the combining unit 106.

The combining unit 106 combines the current window and the window on the upper layer drawn by the drawing unit as described above. Results of the combining of the windows performed by the combining unit 106 are input to the display control unit 107.

The display control unit 107 displays the plurality of windows combined by the combining unit 106 on the display apparatus. Thus, if the size of the display region of the drawing data drawn in the current window is larger than a certain size, the display control unit 107 displays the drawing data in the current window in the overlap region such that the drawing data is visible in the window of the upper layer. In addition, if the size of the display region of the drawing data drawn in the current window is equal to or smaller than the certain size, the display control unit 107 causes the drawing data drawn in the current window not to be drawn in the overlap region.

According to this embodiment of the present invention, if the control unit has judged that the size of the display region in which the drawing data drawn in the window on the lower layer is displayed is larger than the certain size, the drawing data in the window on the lower layer is drawn in such a way as to be visible in the window on the upper layer. Therefore, in comparison with a system that displays only opaque windows, it is possible to increase the amount of information to be displayed on the screen, thereby improving the work efficiency. On the other hand, if the size of the display region of the drawing data in the window on the lower layer is smaller than the certain size, the drawing data in the window on the lower layer is not drawn in the overlap region. Thus, it is possible to omit display of drawing data having a small display region and a small amount of information. Therefore, it is possible to prevent a decrease in the visibility in the overlap region, thereby improving the visibility. Furthermore, in this embodiment, if the size of the display region of the drawing data in the window on the lower layer is equal to or smaller than the certain size, the drawing data in the window on the lower layer is not drawn in the overlap region. Therefore, it is possible to reduce loads caused by the image processing and the drawing process necessary that are necessary to configure the drawing data. As a result of the reduction in loads caused by the drawing process, the drawing speed of the screen can be expected to increase.

In addition, in step S1104 illustrated in FIG. 10, the drawing data may be drawn (S1005) if the size of the display region in which the drawing data drawn in the window on the lower layer is displayed is smaller than the certain size. In this case, if the size of the display region in which the drawing data is displayed is equal to or larger than the drawing omission size, the process proceeds to step S1008 and processing is performed. In doing so, if the size of the window on the lower layer is smaller than the certain size, the probability that the visibility of the overlap region is decreased is low, and therefore it is possible to put priority on the amount of information to be displayed in the overlap region and cause the drawing data in the window on the lower layer to be drawn. On the other hand, if the size of the display region in which the drawing data is drawn is equal to or larger than the certain size, it is possible to cause the drawing data not to be drawn in the overlap region in order to prevent a decrease in the visibility in the overlap region. Furthermore, in this case, since the drawing data in the window on the lower layer is not drawn in the overlap region, it is possible to reduce loads caused by the image processing and the drawing process necessary to configure the drawing data. As a result of the reduction in loads caused by the drawing process, the drawing speed of the screen can be expected to increase.

If the drawing data having a size equal to or larger than the certain size is to be omitted and if there is a plurality of pieces of drawing data in the overlap region in the window on the lower layer, the drawing omission process need not be performed only for a piece of drawing data having the largest size among the plurality of pieces of drawing data. In doing so, it is possible for a user to recognize the outline of the drawing data drawn in the window on the lower layer.

Furthermore, in step S1104 illustrated in FIG. 10, a configuration may be possible in which when to draw the drawing data (S1005) can be selected from between when the size of the display region of the drawing data in the window on the lower layer is larger than the certain size or when the size of the display region of the drawing data in the window on the lower layer is smaller than the certain size. In this case, the control unit 103 determines when to draw the drawing data for the drawing unit. In doing so, it is possible for the user to establish a desired condition in view of the visibility in the overlap region and the amount of information to be displayed, thereby improving the convenience of the user.

Furthermore, in step S1104 illustrated in FIG. 10, if the size of the display region of the drawing data in the window on the lower layer is out of the range of a certain lower limit and a certain upper limit, the drawing data in the window on the lower layer need not be drawn. In this case, the drawing data may be drawn only when the size of the display region of the drawing data in the window on the lower layer is appropriate in terms of the visibility in the overlap region and the amount of information.

As described above, in this embodiment, whether or not to draw drawing data in an overlap region such that the drawing data is visible in a window on an upper layer is controlled in accordance with results of a judgment as to whether or not the size of a display region is larger than a certain size. Therefore, according to this embodiment, it is possible to prevent a decrease in the visibility caused by drawing data in a window on a lower layer when the drawing data is drawn in such a way as to be visible in the window on the upper layer, thereby improving the visibility. In addition, in this embodiment, since the drawing data in the window on the lower layer is not drawn under a certain condition, the drawing speed of the screen can be expected to increase as a result of reduction in loads caused by the drawing process.

The drawing omission size or the certain size, which are to be compared with the size of the display region, may be set in accordance with the size of an overlap region. In doing so, it is possible to determine whether or not drawing of the drawing layer in the window on the lower layer is to be restricted in view of the relative size of the display region in the overlap region.

In this embodiment, if the size of the display region of drawing data in the window on the lower layer is smaller than the certain size (NO in S1104), the drawing unit is configured to cause the drawing data in the current window not to be drawn in an overlap region. The display control method in the overlap region when the size of the display region of drawing data in the window on the lower layer is smaller than the certain size, however, is not limited to this. For example, in another case, the drawing unit may draw the drawing data in the current window such that the drawing data is less visible in the window on the upper layer than when the size of the display region of the drawing data in the window on the lower layer is equal to or larger than the certain size. Upon receiving results of the drawing performed by the drawing unit, the display control unit 107 causes the drawing unit to draw the drawing data in the current window such that the drawing data is less visible in the window on the upper layer than when the size of the display region of the drawing data in the window on the lower layer is equal to or larger than the certain size. In such a configuration, too, it is possible to increase the visibility in the overlap region.

In addition, although the control unit 103 compares the size of the display region of the drawing data in the window on the lower layer with the certain size in this embodiment, the control unit 103 may compare the size of the display region with, instead of the certain size, a size based on the size of the display region of the drawing data in the window on the upper layer. In doing so, in view of the size of the display region of the drawing data drawn in the window on the upper layer, if the visibility of the drawing data drawn in the window on the upper layer is affected, it is possible not to draw the drawing data in the window on the lower layer or restrict the drawing of the drawing data. For example, if the size of the display region of the drawing data in the window on the lower layer is smaller than the size of the display region of the drawing data in the window on the upper layer, it is possible to restrict the drawing of the drawing data in the window on the lower layer in order to increase the visibility of the drawing data in the window on the upper layer. The visibility of the drawing data in the overlap region is thus increased.

In addition, the judgment of the size of the display region of the drawing data may be made for each window. Alternatively, a window may be divided into a plurality of regions and the judgment of the size of the display region of the drawing data and the judgment as to whether or not to draw the drawing data may be made for each region obtained as a result of the division. By judging the size for each region obtained as a result of the division, it is possible to judge whether or not to draw each piece of drawing data even when there are a plurality of pieces of drawing data in the overlap region. On the other hand, when the size of the display region of the drawing data is judged on a window-by-window basis, it is possible to reduce processing loads for the judgment, thereby increasing the drawing speed.

Third Embodiment

In a third embodiment, a display control apparatus will be described that performs control in which drawing of drawing data to be drawn in an overlap region in a window on a lower layer is omitted in accordance with the size of characters or a pattern included in the drawing data.

Differences of the configuration of the display control apparatus according to the third embodiment from the display control apparatus according to the first embodiment will be described. In this embodiment, the management unit 102 generates information regarding the type of drawing data drawn in the overlap region in the window on the lower layer as overlap region information and outputs the information to the control unit 103. In this embodiment, the types of drawing data include characters and a figure. The type of drawing data can be judged from, for example, the type of input device that is being used to input the drawing data, such as a mouse or a keyboard.

In addition, in this embodiment, a drawing unit judges whether or not the display mode for the drawing data to be drawn is a certain display mode. The display mode for drawing data herein may be the size and the type of characters to be drawn, the pattern of a figure when the drawing data is the figure, or the like. The other parts of the configuration are the same as those described in the first embodiment, and therefore description thereof is omitted.

Next, the operation of the display control apparatus according to the third embodiment will be described. The operation of the control unit 103 is the same as that described with reference to FIG. 3, and therefore description thereof is omitted. In addition, the operation of the management unit 102 is the same as that described with reference to FIG. 4, and therefore description thereof is omitted. The operation of a correction unit will be described hereinafter with reference to FIG. 11.

The processes in steps S1001 to S1003 are the same as those described in the first embodiment with reference FIG. 8, and therefore description thereof is omitted by attaching the same reference numerals. If it has been judged that the drawing data is included in an overlap region (YES in step S1003), the drawing unit judges whether the drawing data is characters or a figure (S9001). The judgment as to whether or not the drawing data is characters or a figure is made on the basis of data regarding the type of drawing data in the overlap region information received from the control unit 103.

If the drawing data is characters (YES in S9001), the drawing unit judges whether or not the font size of the characters is larger than a certain value (S9002). If the font size is larger than a certain value, the drawing unit draws the characters (S9004). On the other hand, if the font size is equal to or smaller than a certain value, the process proceeds to step S1008 without the drawing unit drawing the characters.

If the drawing data is a figure (NO in S9001), the drawing unit judges whether or not a pattern corresponding to any of certain patterns is used as the pattern of the figure (S9003). The pattern corresponding to any of certain patterns refers to a pattern that matches or substantially matches any of the certain patterns. If a pattern corresponding to any of the certain patterns is used for the figure (YES in S9003), the drawing unit does not draw the pattern of the figure. Alternatively, in this case, the drawing unit need not draw the figure itself. On the other hand, if the pattern used does not correspond to any of the certain patterns (NO in S9003), the drawing unit draws the pattern of the figure (S9004). As the certain patterns, patterns that would decrease the visibility in the overlap region when drawn in the overlap region, such as complex patterns and intricate patterns, can be registered in advance in such a way as to enable identification thereof. Before the drawing unit draws the pattern of a figure by selecting the pattern from among patterns that have been prepared in advance, identification information may be attached to the patterns that would decrease the visibility so that the drawing unit can identify the patterns. Alternatively, the process in step S9003 may be performed by registering the patterns that would decrease the visibility in advance and by performing pattern matching in order to judge whether or not the pattern of drawing data to be drawn in the overlap region matches any of the patterns that have been registered in advance.

The processes in steps S1008 and S1009 are the same as those described in the first embodiment, and therefore description thereof is omitted by attaching the same reference numerals.

According to this embodiment, the font size of characters drawn in the overlap region in the window on the lower layer is small, and the drawing of the characters is omitted when the visibility in the overlap region would be decreased. Therefore, the visibility in the overlap region is increased. In addition, according to this embodiment, when the pattern of a figure drawn in the window on the lower layer is complex or intricate, the drawing of the pattern or the figure is omitted in order to increase the visibility in the overlap region. In addition, by omitting the drawing process, the drawing speed of the screen can be expected to increase.

In addition, although a case in which drawing of characters or the pattern of a figure is omitted has been described in this embodiment, drawing of characters or the pattern of a figure may be omitted only when the transparency of the window on the upper layer is larger than a certain value of transparency. In addition, as with the first embodiment, the transparency of the window on the upper layer may be decreased instead of performing the drawing omission process. In this case, too, the visibility in the overlap region can be increased. In addition, the font size or the patterns of figures to be compared with drawing data may be changed in accordance with the size of the overlap region.

In addition, although, in the second embodiment, drawing data is compared with a certain font size or a certain pattern when the drawing data is characters or a figure, respectively, the present invention is not limited to this. For example, a judgment may be made by comparing drawing data with a certain font size when the drawing data is characters, but drawing data need not be compared with a certain pattern when the drawing data is a figure. Alternatively, a judgment may be made by comparing drawing data with a certain pattern when the drawing data is a figure, but drawing data need not be compared with a certain font size when the drawing data is characters.

In addition, a certain font size or a certain pattern of a figure to be compared with drawing data may be selected in accordance with the size of the overlap region. In doing so, it is possible to select whether or not to draw the drawing data in accordance with the relative size of the drawing data.

Other Embodiments

Aspects of the present invention can also be realized by a computer of a system or apparatus (or devices such as a CPU, an MPU, and/or the like) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-279888 filed Dec. 15, 2010 and No. 2011-104507 filed May 9, 2011, which are hereby incorporated by reference herein in their entirety.

What is claimed is:

1. A display control apparatus comprising:
an acquiring unit configured to acquire information indicating a font size of first characters in a second window which is overlapped by a first window; and
a display control unit configured to perform control for displaying one or more objects in the first window by determining, based on the acquired information indicating the font size of the first characters in the second window which is overlapped by the first window, a visibility of the first characters in an overlap region where the second window is overlapped by the first window,
wherein, when the font size of the first characters in the second window is larger than a certain font size, the display control unit performs control for displaying second characters in the overlap region visibly, and when the font size of the first characters in the second window is equal to or smaller than the certain font size, the display control unit performs control for displaying the second characters in the overlap region less visibly than the second characters in the overlap region at a time when the font size is larger than the certain font size.

2. A display control method comprising the steps of:
acquiring information indicating a font size of first characters in a second window which is overlapped by a first window; and
performing control, using at least one processor, for displaying one or more objects in the first window by determining, based on acquired information indicating the font size of the first characters in the second window which is overlapped by the first window, a visibility of the first characters in an overlap region where the second window is overlapped by the first window,
wherein, when the font size of the first characters in the second window is larger than a certain font size, performing control for displaying second characters in the overlap region visibly, and when the font size of the first characters in the second window is equal to or smaller than the certain font size, performing control for displaying the second characters in the overlap region less visibly than the second characters at a time when the font size is larger than the certain font size.

3. A non-transitory recording medium that can be read by a computer and on which a program for causing the computer to execute the following procedures is recorded, the computer being capable of performing display control of windows:
an acquiring procedure in which information indicating a font size of first characters in a second window which is overlapped by a first window is acquired; and
a display control procedure in which displaying of one or more objects in the first window is controlled by determining, based on the acquired information indicating the font size of the first characters in the second window which is overlapped by the first window, a visibility of the first characters in an overlap region where the second window is overlapped by the first window,
wherein when the font size of the first characters in the second window is larger than a certain size, performing control for displaying second characters in the overlap region visibly, and when the font size in the second window is equal to or smaller than the certain font size, performing control for displaying the second characters less visibly than the second characters at a time when the font size is larger than the certain font size.

4. A display control apparatus comprising:
an acquiring unit configured to acquire information indicating a font size of characters in a second window which is overlapped by a first window; and
a display control unit configured to control, based on the information acquired by the acquiring unit, a reflection degree of the characters in the second window on an overlap region where the second window is overlapped by the first window,
wherein displaying the overlap region is performed based on one or more objects in the first window and the characters in the second window, and
wherein, when the font size of the characters in the second window is larger than a certain font size, the display control unit performs display control for displaying second characters visibly in the overlap region, and when the font size of the characters in the second window is equal to or smaller than the certain font size, the display control unit performs display control for displaying the second characters less visibly than the characters at a time when the font size is larger than the certain font size.

5. A display control method comprising the steps of:

acquiring information indicating a font size of characters in a second window which is overlapped by a first window; and controlling, using at least one processor and based on the font size acquired, a reflection degree of the characters in the second window to be displayed on an overlap region where the second window is overlapped by the first window, wherein displaying the overlap region is performed based on one or more objects in the first window and the characters in the second window, wherein, when the font size of the characters in the second window is larger than a certain font size, performing display control for displaying second characters visibly in the overlap region, and when the font size of the characters in the second window is equal to or smaller than the certain font size, performing display control for displaying the second characters less visibly than the characters at a time when the font size is larger than the certain font size.

6. A non-transitory recording medium that can be read by a computer and on which a program for causing the computer to further execute the following procedures is recorded, the computer being capable of controlling display of windows:

an acquiring procedure in which information indicating a font size of characters in a second window which is overlapped by a first window is acquired; and a display control procedure in which, based on the font size acquired, a reflection degree is controlled of the characters in the second window to be displayed on an overlap region where the second window is overlapped by the first window, wherein displaying the overlap region is performed based on one or more objects in the first window and the characters in the second window, wherein, when the font size of the characters in the second window is larger than a certain font size, performing display control for displaying second characters visibly in the overlap region, and when the font size of the characters in the second window is equal to or smaller than the certain font size, performing display control for displaying the second characters less visibly than the characters at a time when the font size is larger than the certain font size.

* * * * *